Dec. 1, 1964 G. H. SCHLICK 3,159,435
ROTOR SUPPORT FOR BALANCING MACHINES
Filed May 14, 1962

INVENTOR.
GERHARD H. SCHLICK
BY
Darby, Robertson & Vandenburgh
ATT'YS

United States Patent Office 3,159,435
Patented Dec. 1, 1964

3,159,435
ROTOR SUPPORT FOR BALANCING MACHINES
Gerhard H. Schlick, Dusseldorf, Germany, assignor to Losenhausenwerk Düsseldorfer Maschinenbau A.G., Dusseldorf-Grafenberg, Germany
Filed May 14, 1962, Ser. No. 194,559
Claims priority, application Germany, May 16, 1961,
L 38,988
3 Claims. (Cl. 308—26)

The invention relates to a rotor support, more particular to a support for a rotating unbalance body utilized with balancing machines.

A bending occurs with almost all unbalance bodies or other rotors under high speeds. With rigid or quasi-rigid support of the rotor, twisting and jamming of the rotor shaft in its bearings might occur, which would result in corresponding forces. These forces may disturb the measuring, for instance, with such balancing machines where the forces occurring in the bearing planes are measured as a measure of the unbalance. It is known (see for example German Patents Nos. 1,057,796, 1,045,736) to arrange the bearing bodies so as to be universally titlable and free from friction, so that they have two degrees of freedom. With the known arrangements it is expressly provided that the bearing bodies shall not yield in an axial direction.

The invention is based on the discovery that this provision is disadvantageous. With the bending of the unbalance body, a shortening of the distance of the two unbalance body shafts necessarily results. This shortening although it may be small, nevertheless leads to jamming and interfering forces in the case of inflexible bearing bodies. With friction bearings an axial shifting can only be effected by mutual displacement of the shaft relatively to the bearing body, which, of course, results in frictional forces. With ball bearings the shafts are even fixedly clamped, and axial movement is impossible.

A change of the shaft distance may also be caused through thermal expansion.

In accordance with the present invention, a bearing body support is provided which has, in addition to the two degrees of freedom of movement normally provided, a third degree of freedom wherein the bearing body may move axially.

In the case of balancing machines where the forces in the bearing planes are measured, the balancing should if possible be executed under operating conditions. Therefore, it should be attempted to substantially adapt the support of the rotor in the balancing machine to that position which the rotor assumes when it is placed in operation. In further modification of the invention, the clamping means are exchangeable to achieve this end. Through adequate design of the various clamping means, various clamping support conditions may then be realized. For achieving an anisotropic support, different clamping means may be provided at various points of the periphery.

An embodiment of the invention is presented in the drawings and described as follows.

Figure 1:
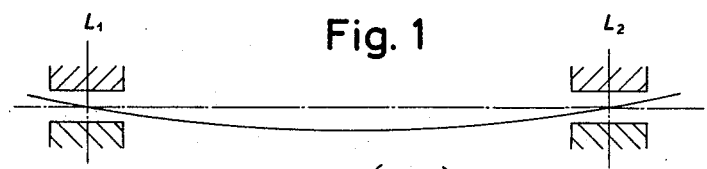
FIG. 1 is a diagrammatic presentation showing the bending which occurs when rotors such as unbalanced bodies are rotated at high speed.

Reference numeral 1 designates the bearing bridge of a balancing machine, which is horizontally movably supported on leaf springs in a manner known as such and pressed against a piezoelectric force-measuring pick-up (not shown) through a spring with initial tension. The spring and pick-up offer support at the machine casing (not shown). Reference numeral 2 designates a bearing body which either receives the proper rotor support, e.g. a roller bearing, or is designed itself as friction bearing box.

The guard ring which concentrically surrounds the bearing body comprises two rings 3 and 4 which are screwed to the bearing bridge 1. Guard rings 3 and 4 have external flanges 3a and 4a respectively which define an annular groove between them. The bearing body 2 is universally secured in the guard ring by means of leaf springs 5. Bearing body 2 has internal flanges 2a within the groove defined by flanges 3a and 4a. The leaf springs 5 are arranged in a radial plane and are inserted in head pieces 6, 7 at both ends. One head piece 7 is supported in a corresponding recess of the bearing body 2, while the rings 3, 4 provide a recess in which the other head piece 6 is supported.

By loosening the rings 3 and 4, the leaf springs can easily be exchanged.

Figure 2:
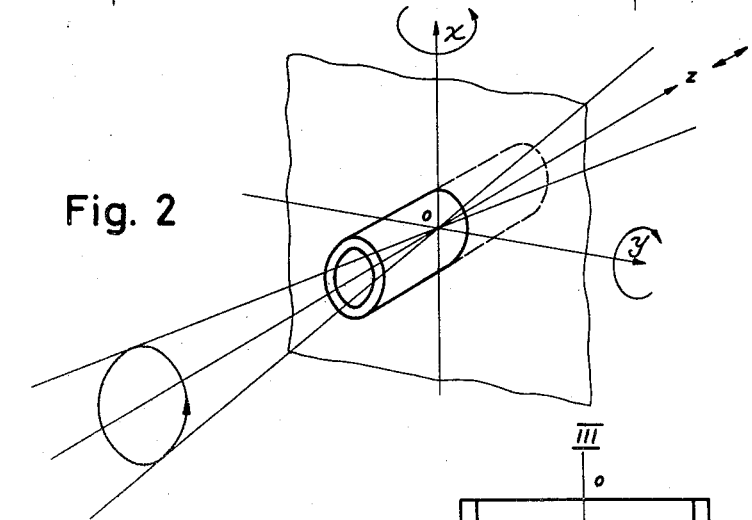
FIG. 2 is a schematic illustration showing the three degrees of freedom, x, y and z provided in the support according to the invention.
Figure 3:
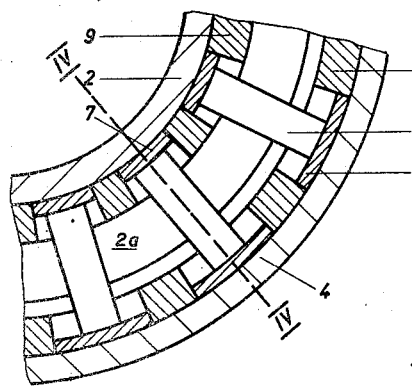
FIG. 3 is a portion of a cross-section taken at the line III—III of FIG. 4.
Figure 4:
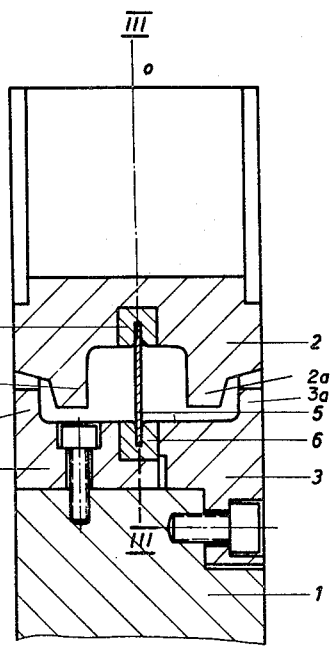
FIG. 4 is a cross-section taken at the line IV—IV of FIG. 3.

The described leaf spring support allows a movement of the bearing body 2 with three degrees of freedom according to FIG. 2 within the limits set herein.

The rotor support of the invention is hereinbefore described by reference to a balancing machine for which it offers particular advantages. It is, however, to be understood that the invention also offers advantages with other rotor supports and is applicable thereto.

Invention is claimed as follows:

1. A rotor support for a balancing machine including: a bearing body member having an opening along an axis, a pair of spaced annular flanges about the outside and defining an annular groove therebetween, and a plurality of coplanar pockets about the base of said groove at spaced intervals about said axis; a bearing bridge member surrounding said body member and having spaced annular flanges smaller in diameter than the flanges on the body member and positioned spaced axial distances beyond the outside of the body member flanges thereby limiting the axial movement of the body member in the bridge member, said bridge member flanges defining an annular groove therebetween, and a plurality of pockets about the base of the bridge member groove and positioned in radial alignment with the body member pockets; a plurality of leaf springs connecting the members, each spring extending from a pocket in the body member to the corresponding radially aligned pocket in the bridge member; one of said members having a removable side, the inner wall of which is coplanar with the pockets of the one member; and means releasably holding said removable side in place and accessible from the outside of the one member, whereby access may be obtained to the springs for removal and replacement.

2. A support as set forth in claim 1, wherein each spring has a head on each end thereof with the heads being positioned in the pockets; and said movable side abuts the respective heads of the springs and clamps said heads in the one member with said means supplying the clamping force.

3. A rotor support for a balancing machine including: an annular bearing body member having a central opening along an axis, and a plurality of pockets about the periphery of said body member, said pockets being equally positioned with respect to a plane normal to said axis; a bearing bridge member surrounding said body member with a cylindrical inner wall facing said body member, and a plurality of pockets about said wall and positioned in radial alignment with the body member pockets, said bridge member pockets being in a position with respect to said plane corresponding to the position of the body member pockets with respect to said plane; a plurality of leaf springs connecting the members, each spring extending from a pocket in the body member to the corresponding radially aligned pocket in the bridge member; one of said members having a removable side, the inner wall of which is co-planar with the side of the pockets of the one member; and means releasably holding said removable side in place and accessible from the outside of the one member, whereby access may be obtained to the springs for removal and replacement; said members having means to limit the axial movement of the body member with respect to the bridge member.

References Cited by the Examiner

UNITED STATES PATENTS

| | | | |
|---|---|---|---|
| 2,159,545 | 5/39 | Bartosch | 308—26 |
| 2,487,343 | 11/49 | Kopf | 308—184 |
| 2,544,166 | 5/51 | Limberger | 308—159 |
| 2,684,877 | 7/54 | Schneider | 308—26 |
| 2,885,583 | 5/59 | Zunick | 308—184 X |
| 2,933,354 | 4/60 | Primeau | 308—184 |

FOREIGN PATENTS 503,540   7/30   Germany.

ROBERT C. RIORDON, *Primary Examiner.*